United States Patent [19]

Burns

[11] Patent Number: 5,085,791
[45] Date of Patent: Feb. 4, 1992

[54] CORROSION-INHIBITED ANTIFREEZE/COOLANT COMPOSITION CONTAINING CYCLOHEXANE ACID(S)

[75] Inventor: Jeffrey M. Burns, Austin, Tex.

[73] Assignee: Texaco Chemical Company, White Plains, N.Y.

[21] Appl. No.: 590,740

[22] Filed: Oct. 1, 1990

[51] Int. Cl.$^5$ .......................... C09K 5/00; C23F 11/12
[52] U.S. Cl. ......................................... 252/79; 252/76; 252/396; 422/7
[58] Field of Search ................. 252/79, 76, 396; 422/7

[56] References Cited

U.S. PATENT DOCUMENTS

| | | | |
|---|---|---|---|
| 4,105,405 | 8/1978 | Wehle et al. | 252/396 |
| 4,329,243 | 5/1982 | Diebel | 252/78.5 |
| 4,587,028 | 5/1986 | Darden | 252/76 |
| 4,647,392 | 3/1987 | Darden | 252/76 |
| 4,657,689 | 4/1987 | Darden | 252/76 |

FOREIGN PATENT DOCUMENTS 1579123  8/1969  France .
57-023070  2/1982  Japan .

Primary Examiner—Paul Lieberman
Assistant Examiner—Christine A. Skane
Attorney, Agent, or Firm—Robert A. Kulason; James J. O'Loughlin; Dominick G. Vicari

[57] ABSTRACT

A corrosion-inhibited antifreeze composition is disclosed. Specifically, the antifreeze composition comprises a major portion of a liquid alcohol freezing point depressant and a minor portion of at least one cyclohexane acid employed as a corrosion inhibitor. Cyclohexane carboxylic acid, cyclohexane acetic acid and cyclohexane propionic acid are preferred, with cyclohexane carboxylic acid being most preferred. Other conventional corrosion inhibitors may be employed in conjunction with the cyclohexane acid(s).

In another embodiment, the present invention relates to a process for inhibiting the general pitting, crevice and deposit attack corrosion of metals present in the cooling system of an internal combustion engine which comprises intimately contacting the metal surface to be inhibited against corrosion with the antifreeze composition described above. Most preferably, the target substrates are aluminum and high lead solder.

23 Claims, No Drawings

CORROSION-INHIBITED ANTIFREEZE/COOLANT COMPOSITION CONTAINING CYCLOHEXANE ACID(S)

BACKGROUND OF THE INVENTION

1. Field of the Invention

This invention relates generally to a corrosion inhibitor and, more particularly, to the use of at least one cyclohexane acid as a corrosion inhibitor in aqueous solutions, such as an antifreeze/coolant composition.

2. Description of Background Art

Automobile engine cooling systems contain a variety of metals, including copper, solder (especially high lead solder), brass, steel, cast iron, aluminum, magnesium, and their alloys. The possibility of corrosive attack on such metals is high, due to the presence of various ions, as well as the high temperatures, pressures, and flow rates found in such cooling systems. The presence of corrosion products within the cooling system can interfere with heat transfer from the engine combustion chambers, which may subsequently cause engine overheating and engine component failure due to excess metal temperatures. See generally Fay, R. H., "Antifreezes and Deicing Fluids", Kirk-Othmer Encyclopedia of Chemical Technology (1978) Vol. 3, pp. 79-95.

Inasmuch as the trend towards improved fuel economy for automobiles has led to the increased use of lightweight materials, such as aluminum and magnesium alloys, for engine and cooling system components, the desire to inhibit or substantially eliminate the corrosion of these particular metal substrates has become an important objective of those skilled in the art.

It has been found that pitting and crevice corrosion are particularly prevalent in aluminum-containing cooling systems. Pitting of thin-walled automobile radiator tubes may lead to tube perforation; crevice corrosion at cylinder head packings or coolant hose connections may also occur. Both types of corrosion may lead to eventual coolant loss, with subsequent engine overheating and component failure. Other forms of localized corrosion, such as deposit attack from deposition of corrosion products, may also result.

Many conventional corrosion inhibitor additives used in automobile cooling systems do not provide adequate protection against the pitting, crevice, and deposit attack corrosion phenomena found with aluminum and various other metal alloys, such as high lead solder.

U.S. Pat. No. 4,851,145 describes a corrosion-inhibited antifreeze/coolant composition, wherein the corrosion inhibitor includes a combination of (a) an alkylbenzoic acid or the alkali metal, ammonium or amine salt thereof, (b) a $C_8$ to $C_{12}$ aliphatic monobasic acid or the alkali metal, ammonium or amine salt thereof; and (c) a hydrocarbyl triazole.

U.S. Pat. No. 4,587,028 describes non-silicate antifreeze formulations which include a corrosion inhibitor including an alkali metal salt of benzoic acid, an alkali metal salt of a dicarboxylic acid and an alkali metal nitrate.

U.S. Pat. No. 4,584,119 describes an antifreeze composition including the dibasic salt of naphthalene dicarboxylic acid and, optionally, a triazole as a corrosion inhibitor.

U.S. Pat. No. 4,389,371 describes an antifreeze composition which includes a corrosion inhibitor having an effective amount of a conventional corrosion inhibitor selected from the group consisting of the alkali metal carbonates, borax, the alkali metal dichromates, the alkali metal silicates, phosphorus acid, phosphoric acid, an alkali metal tungstate, benzotriazole, tolyltriazole, an alkali metal salt of benzoic or toluic acid, an alkali metal salt of a phenol, an alkanolamine and an organo-silicone compound in addition to an alkanolamine phosphate and a heterocyclic nitrogen-containing compound.

U.S. Pat. Nos. 4,342,596 and 4,233,176 describe a nonpetroleum based metal corrosion inhibitor prepared from aliphatic monobasic acids, certain aromatic acids, a lubricant, amines and water.

U.S. Pat. Nos. 4,241,016; 4,241,014; 4,241,013; and 4,241,012 describe hydroxybenzoic acid in antifreeze compositions as a corrosion inhibitor.

U.S Pat. No. 3,425,954 describes a corrosion inhibitor including a mixture of an alkali metal salt of aromatic carboxylic acids (sodium benzoate), an alkali metal salt of nitrous acid (sodium nitrite), an alkyl ester of benzoic acid (butyl benzoate) and a stable compound having a triazole function (benzotriazole). The composition is incorporated in a carrier vehicle, such as propylene glycol, and is adapted to inhibit the corrosion of metals in the presence of hydrogen sulfide and carbon dioxide by direct contact or as a vapor phase inhibitor.

U.S. Pat. Nos. 4,501,667, 4,402,907, and 4,366,076 describe alkylbenzoic acids, such as 4-tert-butylbenzoic acid are useful as metal corrosion inhibitors.

U.S. Patent No. 4,552,678 describes a corrosion inhibitor obtained from the reaction product of a polyamine, an anhydride, and an organic acid of the formula $R_2$-COOH where $R_2$ may be H, a $C_1$ to $C_{12}$ alkyl, a $C_1$ to $C_5$ hydroxyalkyl, phenyl, tert-butyl, phenyl, or styryl radical.

U.S. Pat. No. 3,769,214 describes an aqueous lubricant composition containing a minor amount of a metal anti-staining agent and stability improver which is an alkanolamine salt of a carboxylic acid having at least 12 carbon atoms per molecule.

U.S. Pat. No. 2,832,742 describes the use of a blend of the diethanolamine salts of p-tert-butylbenzoic acid and a high molecular weight $C_7$ to $C_{18}$ aliphatic carboxylic acid mixture derived from an oxidized, petroleum fraction.

Japanese Patent No. 59208082 describes a method of inhibiting corrosion in a cooling water system for an internal combustion engine via addition of a corrosion inhibitor containing a water soluble amine salt of benzotriazole, a water soluble amine salt of t-butylbenzoic acid, a nitrite, and a benzoate to the cooling water.

U.K. Patent Application No. 2,122,598 describes a process and composition for resisting corrosion. The composition comprises (a) at least one $C_6$ to $C_{10}$ aliphatic carboxylic acid, (b) at least one $C_6$ to $C_8$ polyhydroxycarboxylic acid, and (c) at least one aromatic monocarboxylic acid, each of the acids being present as a salt with a salt-forming cation.

API Primary Petroleum Products Abstract No. 76-20709 describes French Patent No. 2268791, which discloses a water soluble ferrous metal corrosion inhibitor which is the condensation product of a $C_1$ to $C_6$ para-alkylbenzoic acid and an alkanolamine.

It is, therefore, my understanding that the use of cyclohexane acids as corrosion inhibitors in aqueous solutions, particularly antifreeze/coolant compositions, has heretofore been unknown; especially where the target substrate is high lead solder and/or aluminum.

SUMMARY OF THE INVENTION

Accordingly, the present invention relates to a corrosion-inhibited antifreeze composition comprising a major portion of a liquid alcohol freezing point depressant and a minor portion of at least one cyclohexane acid employed as a corrosion inhibitor.

In another embodiment, the present invention relates to a process for inhibiting the general pitting, crevice and deposit attack corrosion of metals present in the cooling system of an internal combustion engine which comprises intimately contacting the metal surface to be inhibited against corrosion with the antifreeze composition described above.

DESCRIPTION OF THE PREFERRED EMBODIMENTS

The novel corrosion inhibitor of the present invention comprises at least one cyclohexane acid used alone or in combination with one or more other cyclohexane acids. Preferably, the cyclohexane acids include cyclohexane carboxylic acid, cyclohexane acetic acid and cyclohexane propionic acid. Most preferably, the cyclohexane acid used is cyclohexane carboxylic acid.

The corrosion inhibitor of this invention can also include conventional corrosion inhibitors. Such conventional corrosion inhibitors can include alkali metal borates, alkali metal silicates, alkali metal benzoates, alkali metal nitrates, alkali metal nitrites, alkali metal molybdates, hydrocarbyl thiazoles and mixtures thereof.

An additional corrosion inhibitor which may optionally be employed in admixture with the cyclohexane acid is a $C_8$ to $C_{12}$ aliphatic dibasic acid or the alkali metal, ammonium, or amine salt of said acid. For instance, the foregoing acids or salts can include one or more of the following: suberic, azelaic, sebacic, undecanedioic, dodecanedioic, the diacid of dicyclopentadiene, terephthalic and mixtures thereof. Sebacic acid is particularly preferred. Any alkali metal, ammonium, or amine may be used to form the dibasic acid salt; however, alkali metals are preferred. Sodium and potassium are the preferred alkali metals for use in forming the dibasic acid salt.

In the case where the cyclohexane acid is used in combination with the conventional and/or additional corrosion inhibitors referred to above, the resulting corrosion-inhibited antifreeze/coolant formulation can include from about 0.1 to about 5 weight percent of the cyclohexane acid component and from about 0.1 to about 5 weight percent of the other component. Preferably, the resulting antifreeze/coolant formulation will include from about 1 to about 1.5 weight percent of the cyclohexane acid component and from about 0.75 to about 1.25 weight percent of the other component.

The corrosion inhibitor of the instant invention will most typically be employed in antifreeze formulations as coolants for internal combustion engines. While the present corrosion-inhibitor substantially eliminates the corrosion of all metals found in engine cooling systems, it is particularly well suited for eliminating the corrosion of high lead solder and aluminum. Other applications may include hydraulic fluids, aqueous cutting oils, paints, soluble oils, metal cutting fluids, aircraft deicers, and greases. In these applications, the monobasic and dibasic acid salts may be formed with metal hydroxides including sodium, potassium, lithium, barium, calcium, and magnesium.

In one embodiment of the instant invention, the abovedescribed corrosion-inhibitor, whether it be the cyclohexane acid alone or in combination with the other corrosion inhibitors described above, is employed in admixture with water to form a corrosion-inhibited aqueous composition.

In a preferred embodiment of the instant invention, the above-described corrosion inhibitor is employed in admixture with a liquid alcohol freezing point depressant to form a novel antifreeze/coolant concentrate composition for use in the cooling systems of internal combustion engines. The antifreeze/coolant concentrate composition comprises from about 80 to about 99, preferably from about 90 to about 99 weight percent of a water soluble liquid alcohol freezing point depressant and from about 20 to about 1 weight percent of the instant corrosion inhibitor.

The liquid alcohol freezing point depressant component of the above-described antifreeze/coolant concentrate composition may be a glycol or glycol ether. The glycol ethers which may be employed as major components in the instant invention include glycols, such as ethylene glycol, diethylene glycol, propylene glycol, dipropylene glycol; and glycol monoethers, such as the methyl, ethyl, propyl, and butyl ethers of ethylene glycol, diethylene glycol, propylene glycol, and dipropylene glycol. Ethylene glycol is particularly preferred as the liquid alcohol freezing point depressant component.

In another embodiment of the instant invention, the above-described corrosion-inhibited antifreeze/coolant concentrate composition is diluted with about 10–90 volume percent, preferably about 25–75 volume percent of water.

The following Example II is provided to further illustrate a specific embodiment of the present invention; it should not be construed as limiting the present invention in any way.

EXAMPLES I and II

In Example I, a non-inventive antifreeze/coolant composition was prepared for comparative purposes. The corrosion-inhibited antifreeze/coolant composition of the present invention was prepared in Example II. In Examples I and II the compositions were prepared by combining the components identified below in Table I. Each of the components were mixed at room temperature and at atmospheric pressure. Ethylene glycol was charged into a mixing vessel and was agitated while the remaining components were added in the following order: sodium hydroxide, tolyltriazole, deionized water, and the acid components. The pH was maintained between a level of 8.0 to 9.0.

TABLE I

| Component | Weight Percent | |
|---|---|---|
| | Example I | Example II |
| Ethylene Glycol | 95.5 | 93.4 |
| NaOH (50% by weight in deionized water) | 0.8 | 1.6 |
| Sebacic Acid | 1.0 | 1.0 |
| Deionized Water | 2.5 | 2.5 |
| Tolyltriazole | 0.2 | 0.2 |
| Cyclohexane Carboxylic Acid | 0 | 1.3 |

The corrosion behaviour of the antifreeze/coolant composition prepared in Examples I and II was tested according to the ASTM D-1384 Glassware Corrosion Test, incorporated herein by reference. Table II sets forth the results obtained. The smaller the weight loss of the metal coupon, the greater the corrosion inhibiting properties of a particular formulation. A negative weight loss signifies a weight increase due to the formation of a protective coating on the coupon.

TABLE II

| Metal/Metal Alloy | Example I | Example II | Typical Universal Antifreeze |
|---|---|---|---|
| Copper | 1 | 2 | 5 |
| High Lead Solder | 120 | 0 | 71 |
| Brass | 0 | 2 | 3 |
| Sn/Pb Solder | −3 | 0 | −2 |
| Steel | −1 | 1 | −1 |
| Iron | −2 | −2 | 1 |
| Aluminum | 175 | 10 | 3 |

As these data demonstrate, the antifreeze/coolant formulation of the present invention (Example II) exhibits excellent protection against the corrosion of aluminum and/or high lead solder substrates, relative to that exhibited by the formulation prepared in Comparative Example I and the typical universal antifreeze.

What is claimed is:

1. A corrosion-inhibited antifreeze composition comprising from about 80 to about 99 weight percent of a liquid alcohol freezing point depressant and from about 20 to about 1 weight percent of at least one cyclohexane acid employed as a corrosion inhibitor.

2. The antifreeze composition of claim 1 wherein said freezing point depressant is selected from the group consisting of ethylene glycol, diethylene glycol, propylene glycol, dipropylene glycol and monoethers of said glycols.

3. The antifreeze composition of claim 1 wherein said corrosion inhibitor comprises, in addition to said cyclohexane acid, a second corrosion inhibitor selected from the group consisting of alkali metal borates, alkali metal silicates, alkali metal benzoates, alkali metal nitrates, alkali metal nitrites, alkali metal molybdates, hydrocarbyl thiazoles and mixtures thereof.

4. The antifreeze composition of claim 1 wherein said corrosion inhibitor comprises, in addition to said cyclohexane acid, a second corrosion inhibitor including a $C_8$ to $C_{12}$ aliphatic dibasic acid or the alkali metal, ammonium or amine salt of said acid.

5. The antifreeze composition of claim 4 wherein said aliphatic dibasic acid includes suberic, azelaic, sebacic, undecanedioic, dodecanedioic, the diacid of dicyclopentadiene, terephthalic and mixtures thereof.

6. The antifreeze composition of claim 3 wherein said cyclohexane acid is employed in an amount of about 0.1 to about 5 weight percent and said second corrosion inhibitor is employed in an amount of about 0.1 to about 5 weight percent.

7. The antifreeze composition of claim 3 wherein said cyclohexane acid is employed in an amount of about 1 to about 1.5 weight percent and said second corrosion inhibitor is employed in an amount of about 0.75 to about 1.25 weight percent.

8. The antifreeze composition of claim 4 wherein said cyclohexane acid is employed in an amount of about 0.1 to about 5 weight percent and said second corrosion inhibitor is employed in an amount of about 0.1 to about 4 weight percent.

9. The antifreeze composition of claim 4 wherein said cyclohexane acid is employed in an amount of about 1 to about 1.5 weight percent and said second corrosion inhibitor is employed in an amount of about 0.75 to about 1.25 weight percent.

10. The antifreeze composition of claim 1 wherein said at least one cyclohexane acid is selected from the group consisting of cyclohexane carboxylic acid, cyclohexane acetic acid and cyclohexane propionic and mixture thereof acid.

11. A process for inhibiting the general pitting crevice and deposit attack corrosion of metals present in the cooling system of an internal combustion engine which comprises intimately contacting the metal surface to be inhibited against corrosion with the antifreeze composition of claim 1.

12. The process of claim 11 wherein said metal is high lead solder or aluminum.

13. A corrosion-inhibited antifreeze composition comprising from about 80 to about 99 weight percent of a liquid alcohol freezing point depressant and from about 20 to about 1 weight percent of a corrosion inhibitor, said corrosion inhibitor including at least one member selected from the group consisting of cyclohexane carboxylic acid, cyclohexane acetic acid and cyclohexane propionic acid.

14. The antifreeze composition of claim 13 wherein said freezing point depressant is selected from the group consisting of ethylene glycol, diethylene glycol, propylene glycol, dipropylene glycol and monoethers of said glycols.

15. The antifreeze composition of claim 13 wherein said corrosion inhibitor comprises, in addition to said at least one member, a second corrosion inhibitor selected from the group consisting of alkali metal borates, alkali metal silicates, alkali metal benzoates, alkali metal nitrates, alkali metal nitrites, alkali metal molybdates, hydrocarbyl thiazoles and mixtures thereof.

16. The antifreeze composition of claim 13 wherein said corrosion inhibitor comprises, in addition to said at least one member, a second corrosion inhibitor including a $C_8$ to $C_{12}$ aliphatic dibasic acid or the alkali metal, ammonium or amine salt of said acid.

17. The antifreeze composition of claim 16 wherein said aliphatic dibasic acid is selected from the group consisting of suberic, azelaic, sebacic, undecanedioic, dodecanedioic, the diacid of dicyclopentadiene, terephthalic and mixtures thereof.

18. The antifreeze composition of claim 15 wherein said at least one member is employed in an amount of about 0.1 to about 5 weight percent and said second corrosion inhibitor is employed in an amount of about 0.1 to about 5 weight percent.

19. The antifreeze composition of claim 15 wherein said at least one acid is employed in an amount of about 1 to about 1.5 weight percent and said second corrosion inhibitor is employed in an amount of about 0.75 to about 1.25 weight percent.

20. The antifreeze composition of claim 16 wherein said at least one member is employed in an amount of about 0.1 to about 5 weight percent and said second corrosion inhibitor is employed in an amount of about 0.1 to about 5 weight percent.

21. The antifreeze composition of claim 16 wherein said at least one acid is employed in an amount of about 1 to about 1.5 weight percent and said second corrosion inhibitor is employed in an amount of about 0.75 to about 1.25 weight percent.

22. A process for inhibiting the general pitting crevice and deposit attack corrosion of metals present in the cooling system of an internal combustion engine which comprises intimately contacting the metal surface to be inhibited against corrosion with the antifreeze composition of claim 13.

23. The process of claim 22 wherein said metal is high lead solder or aluminum.

* * * * *

UNITED STATES PATENT AND TRADEMARK OFFICE
CERTIFICATE OF CORRECTION

PATENT NO. : 5,085,791
DATED : Feb. 4, 1992
INVENTOR(S) : Jeffrey M. Burns

It is certified that error appears in the above-identified patent and that said Letters Patent is hereby corrected as shown below:

Column 6, lines 2-3, "propionic and mixture thereof" should read --propionic acid and mixture thereof--.

Signed and Sealed this

Twenty-second Day of June, 1993

Attest:

MICHAEL K. KIRK

Attesting Officer

Acting Commissioner of Patents and Trademarks